Patented Aug. 27, 1940

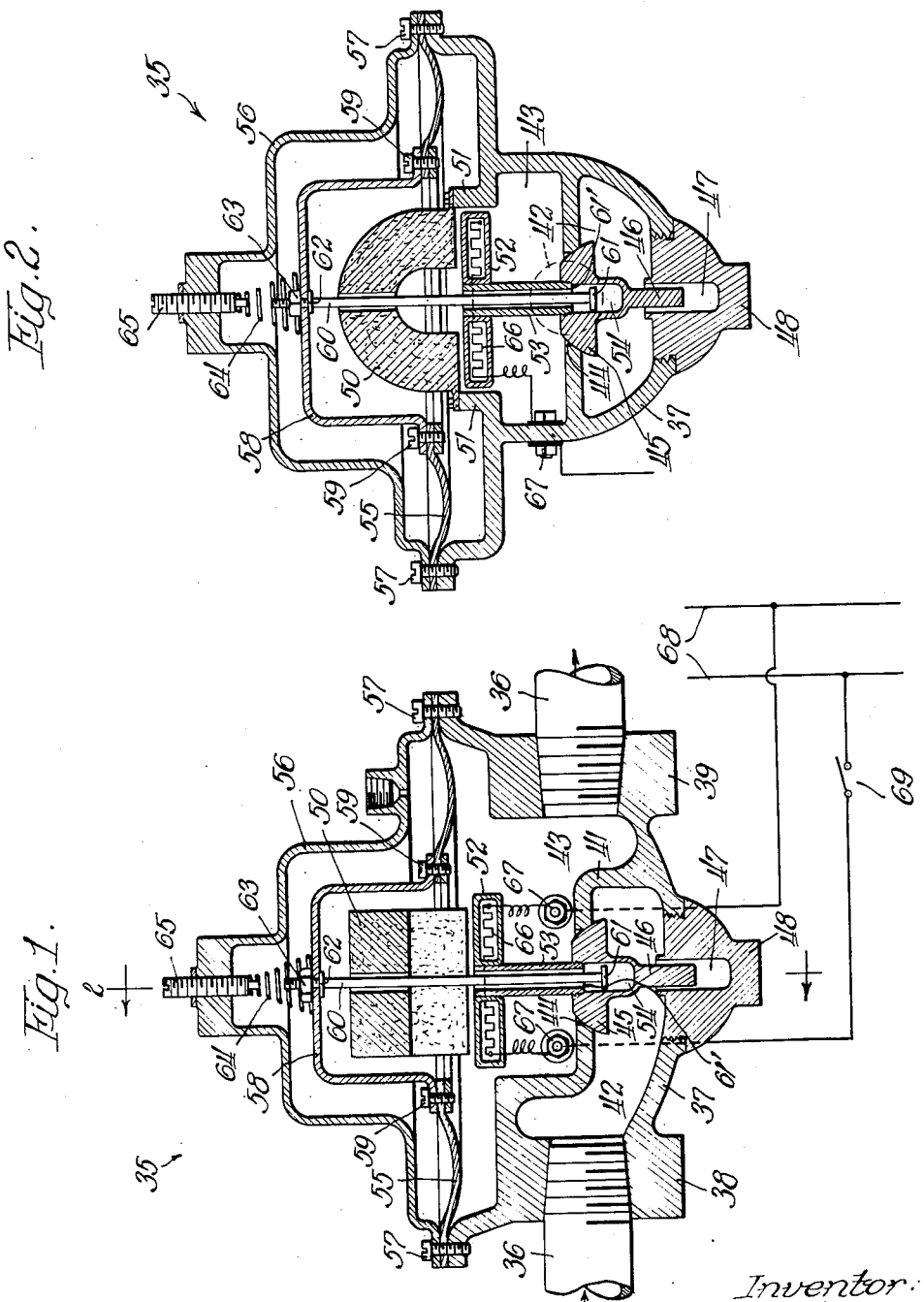

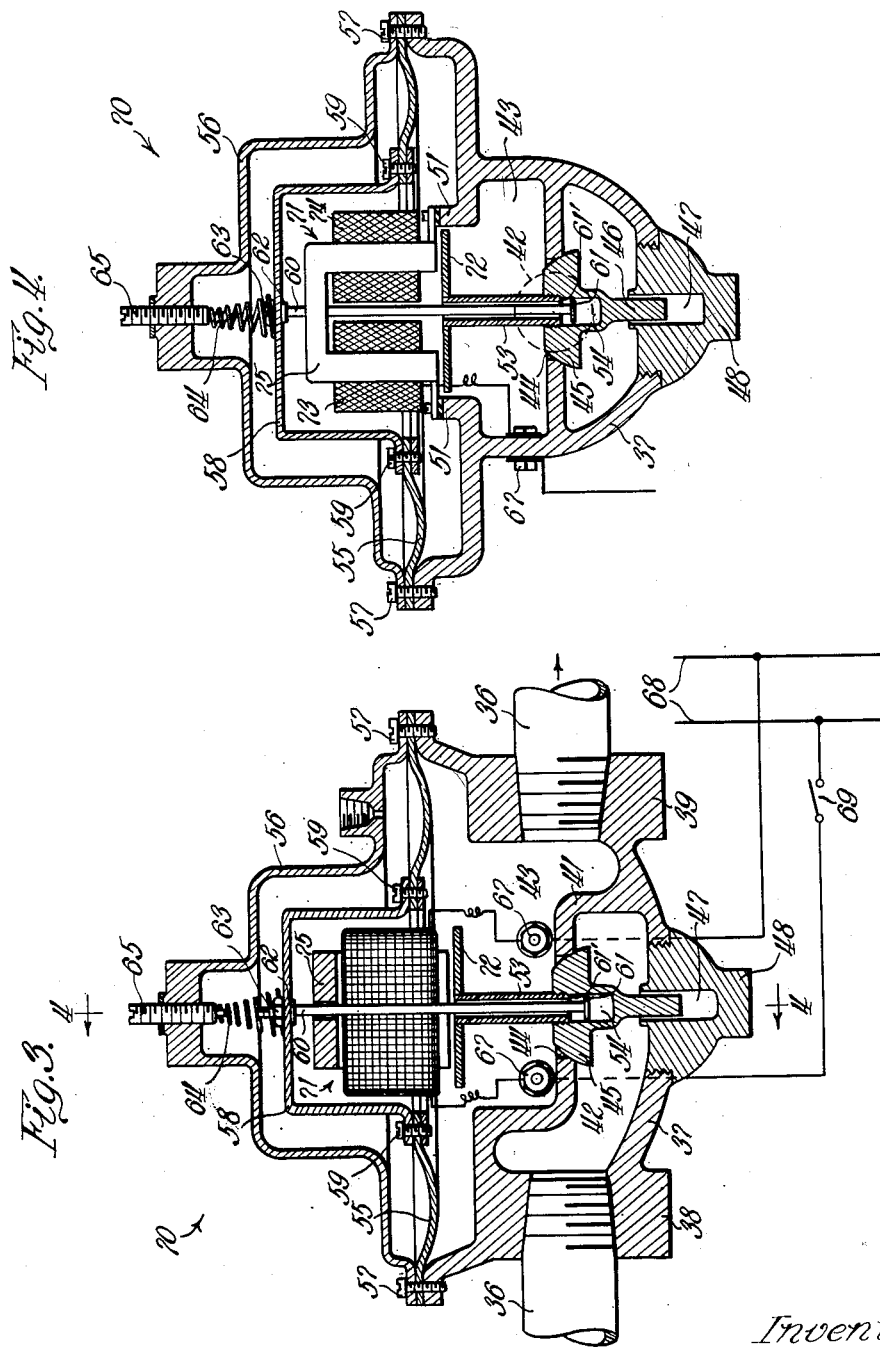

2,212,762

UNITED STATES PATENT OFFICE 2,212,762

APPARATUS FOR CONTROLLING FLUID FLOW

Robert A. Wittmann, Chicago, Ill., assignor to Peoples Gas By-Products Corporation, Chicago, Ill., a corporation of Illinois Application September 6, 1938, Serial No. 228,496

7 Claims. (Cl. 137—139)

My invention relates, generally, to apparatus for controlling fluid flow in conduits and it has particular relation to such apparatus operated in response to both change in fluid pressure and to change in magnetic attraction.

In its more specific embodiments, my invention relates to pressure regulator valves in which the weight of the pressure regulating means is used to open the valve and which weight does not have to be counteracted in the closing of said valve.

In addition to the more usual methods of changing magnetic attraction, I employ the change in magnetic attraction brought about by the change in the magnetic characteristics of a body of Curie point metal.

The employment of Curie point metal allows important design and operating advantages. By Curie point metal, I refer to those metals and alloys that are usually ferro-magnetic but which when heated sufficiently become substantially non-magnetic. The temperature, or Curie point as it is known, at which this change in magnetic characterictics occurs on heating, is distinct for each Curie point metal. This transformation may be the same on heating and cooling or it may be different, depending on the metal used. For example, the Curie point of nickel lies at 350° C., and it is at the same temperature on heating and cooling. The addition of two percent of chromium lowers the Curie point temperature and causes it to take place over an interval of temperature, 240° C.—280° C. on heating. In contrast, the Curie point temperature of cobalt is 1100° C. Thus, it is seen that Curie point metals with practically any desired magnetic characteristics may be obtained by employing various metals and alloys.

I make use of this change in magnetic characteristics of Curie point metals with change in their temperature for controlling the operation of valves. Electrical energy can be used to regulate the temperature of these Curie point metals and by controlling the electric supply circuit by a thermostat, switch, or other well-known devices I provide an electrically controlled valve. I also make these valves responsive to both changes in magnetic characteristics of Curie point metals and to change in fluid pressure as will be set forth in the description given hereinafter.

An important object of my invention is to provide apparatus operated in response to both change in fluid pressure and to change in magnetic attraction.

Another object of my invention is to provide apparatus operated in response to change in fluid pressure and to change in the magnetic characteristics of Curie point metal.

Another object of my invention is to provide pressure regulating apparatus operated in response to change in fluid pressure and to change in magnetic attraction, in which the weight of the pressure regulating means is available to increase the force opening the valve and which does not have to be counteracted when the valve is closed.

Other objects of my invention will, in part, be obvious and in part appear hereinafter.

Accordingly, my invention is disclosed in the embodiments shown in the accompanying drawings, and it comprises the feature of construction, combination of parts and arrangement of elements which will be exemplified in the constructions hereinafter set forth and the scope of the application of which will be indicated in the appended claims.

For a more complete understanding of the nature and scope of my invention, reference may be had to the following detailed description, taken in conjunction with the accompanying drawings, in which:

Figure 1 is a view in vertical section, taken parallel to the direction of flow, of a valve construction acting both as a shut-off valve and a pressure-regulator and illustrating one embodiment of my invention;

Figure 2 is a sectional view taken along the line 2—2 of Figure 1;

Figure 3 is a view in vertical section, taken parallel to the direction of flow, of a valve construction acting both as a shut-off valve and as a pressure regulator and illustrating another embodiment of my invention; and Figure 4 is a sectional view taken along the line 4—4 of Figure 3.

With a view to shutting off or turning on fluid flow in a conduit and to regulating the outlet pressure of the fluid when flowing, I provide a valve of the construction shown in Figures 1 and 2 of the drawings. The reference character 35 designates, generally, such a valve connected in a conduit 36. The valve 35 is made up principally of a valve body 37 with an inlet 38 and an outlet 39 connected in the conduit 36, as shown.

The valve body 37 may be a casting of non-ferro-magnetic metal. A baffle 41 divides the valve body 37 into an inlet chamber 42 and an outlet chamber 43. A valve port 44 in the baffle 41 connects the chambers 42 and 43. The port 44 is closed by a valve member 45 having a guide pin 46 formed thereon which operates in a guide pin recess 47 in a valve plug 48. A permanent magnet 50 is supported over the valve port 44 by a pair of lugs 51 projecting from the valve body 37. A hollow disc 52 of Curie point metal is supported from the valve member 45 by a tube 53 which screws into a recess 54 in the valve member 45. The tube 53 is of such length that, when the disc 52 is attracted to the magnet 50, the valve member 45 will close the port 44. With a view to closing off the top of the outlet chamber 43, a flexible diaphragm 55 is provided, the outer edge of which is clamped between the oposing edges of the valve body 37 and a valve cover 56, which may be held together by the screws 57. The closing off of the outlet chamber 43 is completed by the inverted cup 58 which fits over the magnet 50 and the bottom edges of which are clamped to the inner edges of the diaphragm 55 by screws 59, as shown. A rod 60 is supported by the cup 58 and passes centrally through the magnet 50, disc 52 and tube 53, and into the recess 54. A head 61 is formed on the lower end of the rod 60 which, when the rod is lifted, bears against the lower end 61' of the tube 53 and thereby lifts the valve member 45. The rod 60 is secured on its upper end to the top 58 by a collar 62 and nut 63. A coil spring 64 is provided for regulating the freedom of movement of the cup 58. The top of the coil spring 64 engages an adjusting screw 65 and the bottom engages the top of the cup 58. In order that the disc 52 may be heated above its Curie point an electric heater 66 is provided within it. The terminals of the heater 66 are connected to a pair of binding posts 67 which pass through the valve body 37 and are insulated therefrom, as is shown. The electric heating coil 66 may be energized from the energized conductors 68 through a switch 69.

In operation, the disc 52 will be below its Curie point when the switch 69 is open and will, therefore, be ferro-magnetic, and, when the disc 52 is ferro-magnetic, it will be attracted to the magnet 50 holding the valve member 45 in the closed position. The valve member 45 being closed, there will be no fluid pressure in the chamber 43 due to the fluid pressure in the conduit 36. Since there is no fluid pressure in the chamber 43, the diaphragm apparatus made up of the diaphragm 55, inverted cup 58 and spring 64 will have fallen allowing the end 61 of the rod 60 to rest and bear against the bottom of the recess 54. As the disc 52 is now very close to the magnet 50, the attraction therebetween will be sufficient to hold up the weight of the diaphragm apparatus in addition to the weight of the disc 52 and the valve member 45. When it is desired for fluid to flow through the valve 35, the switch 69 is closed thereby energizing the heating coil 66 and causing the disc 52 to be heated above its Curie point and become non-magnetic. When the disc 52 becomes non-magnetic, it will no longer be attracted to the magnet 50 and will, therefore, drop, due to the combined weight of the disc 52, valve member 45, and the diaphragm apparatus and in addition whatever pressure is exerted by the spring 64. When the valve member 45 drops, the port 44 will be open. In the open position, the valve member 45 will be supported by the lower end 61' of the tube 53 bearing against the head 61 of the rod 60. It is seen that when the valve member 45 is in the open position, the pressure of the fluid flowing through the valve 35 will act on the undersides of the diaphragm 55 and the cup 58 which close off the top of the outlet chamber 43. This pressure will cause the cup 58 to rise and fall, according to any change in pressure in the chamber 42, thereby carrying the rod 60 and also the valve member 45 with it in its up and down motion, and thereby maintaining a substantially constant pressure in the chamber 43 regardless of changes in pressure in the chamber 42. The degree of regulation may be varied by the adjusting screw 65 controlling the compression of the coil spring 64. Now, when the switch 69 is opened, the disc 52 will soon cool off and be attracted to the magnet 50, thereby closing the valve 35. It will be seen that since the pressure in the chamber 43 holds the cup 58 up the valve member 45 can move to the closed position without the head 61 of the rod 60 bearing against the bottom of the recess 54. This means that the magnetic attraction between the magnet 50 and the disc 52 does not have to work against the weight of the diaphragm apparatus or the spring pressure of the spring 64. As soon as the valve member 45 is closed, as shown in Figures 1 and 2, the pressure in the chamber 43 will be released and the diaphragm apparatus will again drop causing the head 61 of the rod 60 to bear against the bottom of the recess 54. The valve 35 will now be in condition to be reopened.

This principle of using the weight of the diaphragm apparatus to help open the valve 35 without having to be counteracted in the closing makes it possible to open a valve under relatively high line pressure in the chamber 42. There is a great need for a valve of such opening and closing characteristics as, for example, in gas lines where specifications require that a valve be able to open under three times the normal line pressure. It is seen that since the force of attraction between the disc 52 and the magnet 50 varies inversely as the square of the distance between them, it is possible for a relatively heavy load or weight to be held up by this attraction when the disc 52 is very close or substantially touching the magnet 50, whereas when the valve member 45 is in the open position and the disc 52 at a distance from the magnet 50 only a very small load can be held up.

With a view of providing another valve construction embodying this feature, i. e., (using the weight of the pressure regulating apparatus to help open a valve without having to counteract the weight on the closing), and illustrating another embodiment of my invention, I provide a valve shown, generally, at 70 in Figures 3 and 4 of the drawings. The valve 70 is of the same construction as the valve 35, of Figures 1 and 2, except that the permanent magnet 50 is replaced by an electromagnet 71, and the disc of Curie point metal 52 is replaced by a ferromagnetic member or disc 72. The ferromagnetic member or disc 72 is made preferably of a high permeability iron. The electromagnetic 71 consists of two coils 73 and 74 and a soft iron armature 75. The terminals of the coils 73 and 74 are connected to binding posts 67 corresponding to those in valve 35. In this case, when the switch 69 is closed, the electromagnet 71 is energized instead of the heating coil 52.

The operation of valve 70 is the same as that of valve 35 with two exceptions. First, in order to close the valve 70, the switch 69 must be closed, thereby energizing the electromagnet 71 and, second, to open the valve 70 the switch 69 must be opened, thereby de-energizing the electromagnet 71 and allowing the valve member 45 to drop to the open position. It is seen that in the operation of both valve 35 and valve 70 the valve member 45 is operated according magnetic attraction plus cooperation with the diaphragm or pressure regulating apparatus. In valve 35 magnetic attraction is changed by changing the magnetic characteristics of the disc 52 of Curie point metal, whereas, in valve 70 this magnetic attraction is changed by establishing or cutting off a magnetic field set up by the electromagnetic 71.

It will be understood that the feature of my invention whereby the weight of a pressure regulating apparatus is used to increase the opening force of a valve member without acting against the closing force of the valve member is not limited to the two embodiments illustrated by the valves 35 and 70. For instance, the valve member 45 might be connected to a bimetallic disc which could be heated by suitable heating means controlled by the switch 69. Other embodiments of this feature may also be apparent.

Valves embodying my invention, although useful for controlling the flow of both liquid and gaseous fluids, are especially useful in connection with gaseous fluids.

Since certain further changes can be made in the foregoing constructions, and different embodiments of the invention may be made without departing from the scope thereof, it is intended that all matter shown in the accompanying drawings or described hereinbefore shall be interpreted as illustrative, and not in a limiting sense.

I claim as my invention:

1. Means for controlling fluid flow in a conduit comprising, in combination, valve means in the conduit including a single valve member movable between open and closed positions, means responsive to change in fluid pressure in said conduit for controlling the movement of said valve member, and means cooperating with the last-named means for controlling jointly therewith the movement of said valve member including means for establishing magnetic flux, means operated in accordance with attraction by said magnetic flux, and means selectively controlled for regulating the magnetic attraction, the weight of said means responsive to change in fluid pressure in said conduit being available to increase the valve opening force but unavailable to counteract the valve closing force.

2. Means for controlling fluid flow in a conduit comprising, in combination, valve means in the conduit including a single valve member movable between open and closed positions, diaphragm means responsive to change in fluid pressure in said conduit connected with said valve member in lost motion relationship for controlling the movement thereof, and means cooperating with said diaphragm means for controlling jointly therewith the movement of said valve member including means for establishing magnetic flux, a member connected to said valve member operated in accordance with attraction by said magnetic flux, and means selectively controlled for regulating the magnetic attraction, the weight of said diaphragm means being available to increase the valve opening force but unavailable to counteract the valve closing force.

3. Means for controlling fluid flow in a conduit comprising, in combination, valve means in the conduit including a single valve member movable between open and closed positions, means responsive to the presence or absence of fluid flow in said conduit for controlling the movement of said valve member, and means cooperating with the last-named means for controlling jointly therewith the movement of said valve member including means for establishing magnetic flux, a body of Curie point metal in the field of said flux, means controlling the temperature of said body of Curie point metal to change its magnetic characteristic, and a member movable in accordance with the change in said magnetic characteristics, said body of Curie point metal being positioned in substantial heat conducting relation with the fluid flowing through said conduit whereby, when heat is no longer applied thereto, it is rapidly cooled by conduction of heat therefrom to the fluid and said valve member is quickly moved to the closed position.

4. Pressure regulator means for controlling the flow of fluid in a conduit comprising, in combination, valve means in the conduit including a single valve member movable between open and closed positions, magnet means stationarily mounted with respect to said valve member, a body of Curie point metal operatively connected to said valve member and disposed in the field of said magnet means, means for heating said body of Curie point metal to change its magnetic properties and thereby effect control of the movement of said valve member, diaphragm means responsive to change in fluid pressure operatively connected to said valve member in lost motion relationship and thereby regulating the movement of said valve member between open and closed positions in accordance with the change in fluid pressure in said conduit, and spring means for adjustably regulating the movement of said diaphragm means, the weight of said diaphragm means being available to increase the valve opening force but unavailable to counteract the valve closing force.

5. Pressure regulator means for controlling the flow of fluid in a conduit comprising, in combination, valve means in the conduit including a single valve member movable between open and closed positions, magnet means stationarily mounted with respect to said valve member, a body of Curie point metal operatively connected to said valve member and disposed in the field of said magnet means, means for heating said body of Curie point metal to change its magnetic properties and thereby effect control of movement of said valve member, and diaphragm means responsive to change in fluid pressure operatively connected to said valve member in lost motion relationship and thereby regulating the movement of said valve member between open and closed positions in accordance with the change in fluid pressure in said conduit, said body of Curie point metal being positioned in substantial heat conducting relation with the fluid flowing through said conduit whereby, when heat is no longer applied thereto, it is rapidly cooled by conduction of heat therefrom to the fluid and said valve member is quickly moved to the closed position.

6. Pressure regulator means for controlling the flow of fluid in a conduit comprising, in combination, valve means in the conduit including a single valve member movable between open and closed positions, an electromagnet stationarily mounted with respect to said valve member, a ferro-magnetic member operatively connected to said valve member and disposed in the flux field created by said electromagnet, said valve member being in the closed position when said flux field is created and in the open position when there is no flux field existant, means for controlling said electromagnet, and diaphragm means responsive to change in fluid pressure operatively connected to said valve member in lost motion relationship and thereby regulating the movement of said valve member in accordance with change in fluid pressure in said conduit, the weight of said diaphragm means being available in addition to the weights of said ferro-magnetic member and said valve member for increasing the valve opening force but unavailable to counteract the valve closing force.

7. Valve means for controlling the flow of fluid comprising, in combination, a single valve member movable between opened and closed positions, selectively controlled means for opening or closing said valve member, and diaphragm means connected with said valve member in lost motion relationship and subject to fluid pressure when said valve member is in the open position for regulating valve outlet pressure, the weight of said diaphragm means being available to increase the valve opening force but unavailable to counteract the valve closing force.

ROBERT A. WITTMANN.